United States Patent Office 3,536,733
Patented Oct. 27, 1970

1

3,536,733
METHOD FOR THE PREPARATION OF HALOGENATED EPOXIDES
Dana Peter Carlson, Wilmington, Del., assignor to E. I. du Pont de Nemours and Company, Wilmington, Del., a corporation of Delaware
No Drawing. Continuation of application Ser. No. 509,424, Nov. 23, 1965, which is a continuation-in-part of application Ser. No. 329,885, Dec. 11, 1963. This application Aug. 10, 1967, Ser. No. 659,816
Int. Cl. C07d 1/08
U.S. Cl. 260—348.5                13 Claims

ABSTRACT OF THE DISCLOSURE

Certain halogenated olefins, e.g., hexafluoropropylene, are diluted with either an inert gas or an inert liquid solvent and reacted at 50 to 250° C. and superatmospheric pressure with oxygen to form the corresponding epoxide.

---

This application is a continuation of my copending application Ser. No. 509,424, filed Nov. 23, 1965, now abandoned, which is in turn a continuation-in-part of copending application Ser. No. 329,885, filed Dec. 11, 1963 now abandoned.

This invention relates to an improved process for the preparation of halogenated epoxides and, more particularly, to the preparation of partially or fully fluorinated olefin epoxides by the autoxidation of the corresponding olefins.

Several methods are available for the preparation of fluorinated epoxides. Some of these methods involve the reaction of fluorinated olefins with oxygen in the presence of a catalyst, e.g., halogens in the presence of actinic radiation. Another method employs a medium of alkaline hydrogen peroxide to convert the fluorinated olefins to the corresponding epoxide. In general, these heretofore known methods are either highly involved and hard to control or result in low yields of the desired fluorinated epoxide.

In accordance with the present invention it has been discovered that partially and fully fluorinated epoxides can be prepared from halogenated olefins without the use of added catalysts. These epoxides are prepared by heating a haloolefin, $CF_2=CFX$, wherein X is a radical selected from the class consisting of H, F, Cl, $CF_3$, $CF_2H$, $CF_2Cl$, $C_2F_5$, $CF_2CF_2H$, and $CF=CF_2$ with oxygen at superatmospheric pressures in the presence of an inert diluent at a temperature of from 50° to 250° C. and recovering a halogenated epoxide,

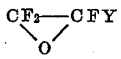

wherein Y is a radical selected from the class consisting of H, F, Cl, $CF_3$, $CF_2H$, $CF_2Cl$, $C_2F_5$, $CF_2CF_2H$, and $CF_2COF$.

2

The process of the present invention can be carried out batchwise or continuously in a closed vessel. An autoclave, constructed of metal, and provided with means for stirring and heating liquids under pressure is a suitable reactor. Suitable means for introducing gases and liquids and drawing off reaction products are also provided. Generally speaking, metals do not interfere with the present process; therefore, any metal which is relatively inert to oxygen, the haloolefins, and the reaction products is suitable as a material of construction for the present process. The reactor can be constructed of glass or a metal reactor can be lined with polytetrafluoroethylene or glass, if desired. Stainless steel is generally satisfactory, although when preparing trifluoroethylene epoxide, tetrafluoroethylene epoxide, and chlorotrifluoroethylene epoxide, the steel surface may under certain conditions cause the partial rearrangement of these epoxides to their corresponding haloacetyl fluorides. Other metals, from which the reactor or its wall lining may be constructed and which may not catalyze the epoxide rearrangement, are copper, nickel and its alloys, chromium, titanium, silver, and platinum. Tubular reactors are also suitable. With a tubular reactor, stirring is not required.

Gaseous oxygen, either pure or in combination with other inert gases, e.g., air, may be employed in the present process. The molar ratio of haloolefin to oxygen should be, preferably, greater than one and can be as high as 30/1. At the lower ratios of haloolefin to oxygen, high conversions of haloolefin are obtained with a high rate of reaction and a lower yield of the haloolefin epoxide. When higher ratios of haloolefin to oxygen are used, the rate of reaction is lower and yield of haloolefin epoxide is higher accompanied by a decreased conversion. Higher conversions can be obtained by adding oxygen in successive steps, thereby maintaining a higher haloolefin to oxygen ratio at any given time.

In the oxidation of tetrafluoroethylene to tetrafluoroethylene epoxide the ratio of tetrafluoroethylene to oxygen must be low or excessive formation of polytetrafluoroethylene will result in a poor yield of the epoxide. The yield of epoxide in this case can be improved considerably by carrying out the reaction at lower tetrafluoroethylene to oxygen ratios. Preferably, a ratio below 5/1 should be employed. Thus, depending on the haloolefin being oxidized and the method of operation employed, i.e., batch or continuous, (where in the latter operation a recycle stream of unconverted olefin would be included) the ratio of haloolefin to oxygen is varied over the wide range specified to obtain the optimum rate of reaction and yield of haloolefin epoxide.

The reaction of the present invention is carried out in the presence of an inert diluent. All of the haloolefins operable in this process are usually gaseous under the reaction conditions employed and the use of a diluent serves to facilitate the reaction. The inert diluent can be in a liquid or gas phase. In some situations the diluent will be in the liquid phase when introduced into the reactor and then converted to the gas phase when the temperature of the reactor is raised above the critical temperature of the diluent.

When a liquid phase inert diluent is employed, oxygen is employed at partial pressures up to about 200 p.s.i. The oxygen pressure is in excess of the autogenous pressure exerted by the solution (haloolefin in inert diluent) at the particular reaction temperature employed. The autogenous pressures normally encountered in the process of the present invention can be as high as 500 p.s.i. Consequently, the total pressures employed in the reactor will vary from above atmospheric pressure to about 700 p.s.i. For a maximum yield of epoxide, the vapor space in the reactor should be held to a minimum.

When a gas phase inert diluent is employed in the present process, higher pressures can be employed depending on the density of the gaseous diluent desired at the temperature of the reaction. These pressures can exceed 1400 p.s.i.

The inert diluents suitable in the process of the present invention are those which would not react with oxygen under the reaction conditions and which would not react with acid fluorides or the reaction products formed during the process. These inert diluents can be either gaseous or liquid and may be classified generally as follows: (1) nitrogen; (2) carbon dioxide; (3) noble gases; (4) carbon compounds containing only C—C, C—F, C—Br, C—Cl, C—O, C—S, C—N, and C—H single bonds and in which the C—H group is limited to one H per carbon atom and such carbon atoms are in turn bonded only to fluorine, a combination of fluorine and carbon, a combination of chlorine and carbon, a combination of fluorine, oxygen and carbon, and a combination of fluorine and chlorine; (5) unsaturated compounds containing only carbon and fluorine or carbon, fluorine and chlorine in which both carbon atoms of the double bond are in turn bonded to at least one carbon atom; (6) compounds having the structure $$R-\overset{O}{\underset{\|}{C}}-R'$$

or $$R-\overset{O}{\underset{\|}{C}}-F$$

where R and R' are monovalent radicals containing only C—C, C—F, C—Br, C—Cl, C—O, C—S, C—N and C—H single bonds and in which the C—H group is limited to one H per carbon atom and such carbon atoms are in turn bonded only to fluorine, a combination of fluorine and carbon, a combination of chlorine and carbon, a combination of fluorine, oxygen and carbon, or a combination of fluorine and chlorine, and (7) mixtures of the above classes.

Examples of typical fluids suitable as an inert diluent in the process of the present invention are: $N_2$ $CO_2$, He, Ne, Ar, $CF_4$, $C_6F_{14}$, cyclo-$C_4F_8$, iso-$C_6F_{14}$, $$HCF_2(CF_2)_4CF_2H$$

$CCl_4$, $CF_2Cl_2$, $CF_2HCl$, $C_2F_3Cl_3$, $CCl_3(CF_2)_4CCl_3$.

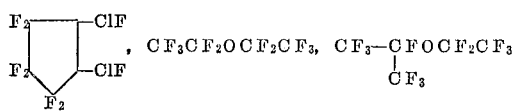, $CF_3CF_2OCF_2CF_3$, $CF_3-\underset{\underset{CF_3}{|}}{C}FOCF_2CF_3$

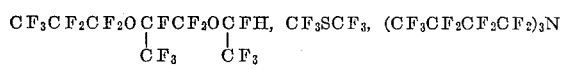

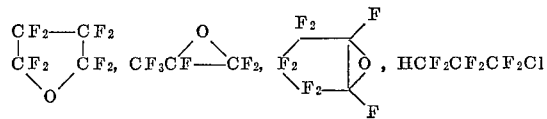, $HCF_2CF_2CF_2Cl$

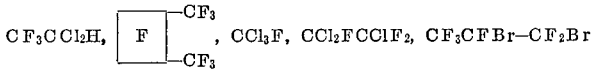, $CCl_3F$, $CCl_2FCClF_2$, $CF_3CFBr-CF_2Br$ $CF_2BrCFClBr$, $CF_3CF_2CF_2O(\underset{\underset{CF_3}{|}}{C}F-CF_2O)_2-CFH-CF_3$

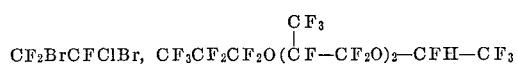, $CF_3CF=CFCF_3$, $CF_3\overset{O}{\underset{\|}{C}}F$

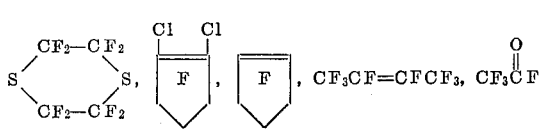

$ClCF_2\overset{O}{\underset{\|}{C}}CF_2Cl$, 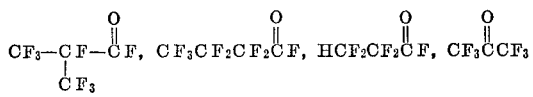=O, $HCF_2\overset{O}{\underset{\|}{C}}CF_3$, $CF_3\overset{O}{\underset{\|}{C}}-F$ $\left(CF_3CF_2CF_2\overset{O}{\underset{\|}{C}}\right)_2O$, $CF_3CF_2CF_2O\underset{\underset{F}{\diagdown}}{\overset{\overset{CF_3}{|}}{C}}-C\overset{O}{\diagup}$ and mixtures thereof.

The concentration of haloolefin in the diluent from 1 to 50 weight percent with a concentration of from 5 to 20 weight percent generally preferred. The optimum concentration for the best yield of epoxide, however, depends on the haloolefin employed.

In general, reaction temperatures are an important variable in this process. Temperatures of from 50° to 250° C. are satisfactory with narrow ranges being optimum for specific haloolefins. The more active haloolefins can be reacted at lower temperatures, e.g., chlorotrifluoroethylene at about 75° C. and tetrafluoroethylene at 90 to 110° C., whereas, hexafluoropropylene being less active, requires temperatures in the range of 130° to 250° C. Higher reaction temperatures tend to decompose the epoxide and thus to a degree govern the upper limit of the operable temperature range.

The rate of reaction in the process of the present invention is relatively fast and in most cases good yields and high conversions can be expected in less than two hours. In those cases where the epoxide formed is stable, longer reaction times may be employed with a resulting increase in conversion. In any event, the optimum reaction time depends to a great extent upon the haloolefin used and the reaction temperature.

The major product in the reaction mixture of the present process is the haloolefin epoxide. Other principal side products present in smaller amounts are carbonyl fluoride, acid fluoride, and perfluorocyclopropane or a derivative thereof. These products would form as a result of reactions illustrated as follows:

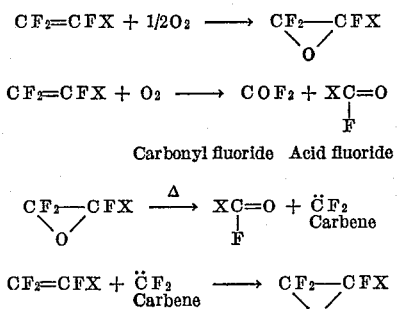

The epoxide isolated from the reaction of perfluorobutadiene epoxide and oxygen is an epoxidized acid fluoride, viz., 3,4-epoxy-perfluorobutyryl fluoride.

Several methods are available for the isolation of the haloolefin epoxides in the reaction mixture. Where a significant difference exists in the boiling points of the haloolefin epoxide and its haloolefin precursor, fractional distillation can be employed. In those cases where the boiling points are too close to satisfactorily separate the epoxide in this manner, e.g., with hexafluoropropylene epoxide (−27.4° C.) and hexafluoropropylene (−29.4° C.), the haloolefin can be brominated to yield the corresponding dibromide, a compound having a higher boiling point and sufficiently different from that of the epoxide to allow ready separation of the latter by fractional distillation. The haloolefin dibromide can be treated with zinc dust to recover the haloolefin, if desired.

The yields of the haloolefin epoxides which can be obtained in the operation of the present process are in the 70–90% range at greater than 50% conversion of the haloolefin under optimum reaction conditions. The yields and conversions can be determined in several ways. In addition to calculating the yield and conversion from the amount of "in hand" product available from fractional distillation, several quantitative methods employing infrared and gas chromatographic analysis are useful and accurate.

The following examples illustrate the process of the present invention but are merely illustrative and not to be construed as limiting since obvious modifications would occur.

EXAMPLES I TO VI

Tetrafluoroethylene epoxide and hexafluoropropylene epoxide were produced using the reagent quantities and conditions set forth in Tables A–1 and A–2 by the following procedure.

Into an evacuated one liter stainless steel autoclave was charged diluent and haloolefin. The mixture was then heated to reaction temperature with agitation and oxygen was introduced continuously. The reaction was continued until no further oxygen was absorbed. The contents of the reaction mixture were vented to a liquid nitrogen trap from which the reaction products were isolated and analyzed by gas chromatography. In the reactions illustrating the conversion of hexafluoropropylene to the corresponding epoxide, an inert tracer gas, perfluoropropane, was employed as a standard. Thus, when the reaction mixture was chromatographed, the epoxide/perfluoropropane and olefin-/perfluoropropane volume ratios obtained were converted to percent yield and percent conversion by comparison with the initial olefin/perfluoropropane ratio. The results are set forth in Tables A–1 and A–2.

TABLE A-1

| Example | Diluent Name | Diluent Weight, grams | Diluent Volume, ml. | Haloolefin Name | Haloolefin Weight, grams | Haloolefin Moles | Oxygen Initial, moles | Oxygen Final, moles | Reaction conditions Temp., °C. | Time, minutes | Pressure Initial, p.s.i. | Pressure After O₂ addition | Pressure Final | Product distribution Mole percent, epoxide | Mole percent, olefin | Mole percent, carbonyl fluoride | Mole percent, PCP² | Percent yield | Percent conversion |
|---|---|---|---|---|---|---|---|---|---|---|---|---|---|---|---|---|---|---|---|
| I | F-113[1] | 1,086 | 700 | TFE[4] | 60 | 0.60 | 0.09 | 0.40 | 101-104 | 25 | 215 | 265 | 265 | 53.6 | 8.9 | 27.2 | 10.3 | 63 | 90 |
| II | F-113[1] | 1,086 | 700 | TFE[4] | 84 | 0.84 | 0.09 | 0.37 | 100 | 15 | 230 | 300 | 305 | 40.2 | 30.8 | 27.6 | 1.4 | 72 | 65 |
| III | F-113[1] | 1,086 | 700 | TFE[4] | 26 | 0.26 | 0.08 | 0.17 | 98-101 | 15 | 140 | 180 | 190 | 32 | 45 | 21.6 | 1.4 | 79 | 48 |

TABLE A-2

| Example | Diluent Name | Diluent Weight, grams | Diluent Volume, ml. | Haloolefin Name | Haloolefin Weight, grams | Haloolefin Moles | Olefin, PFP² ratio | Oxygen Initial, moles | Oxygen Final, moles | Reaction conditions Temp., °C. | Time, minutes | Pressure Initial, p.s.i. | Pressure After O² addition | Pressure Final | Product distribution, ratios Epoxide, PFP | Olefin, PFP | Mole percent, PCP² | Percent yield | Percent conversion |
|---|---|---|---|---|---|---|---|---|---|---|---|---|---|---|---|---|---|---|---|
| IV | F-113[3] | 965 | 675 | HFP[5] | 164 | 0.985 | 11.35 | 0.107 | 0.41 | 149-150 | 60 | 310 | 380 | 395 | 5.55 | 3.37 | | 70.5 | 70 |
| V | F-11[3] | 933 | | HFP[5] | 165 | 1.00 | 13.35 | 0.15 | 0.52 | 146-152 | 17 | 465 | 560 | 570 | 5.72 | 3.67 | | 59 | 72 |
| VI | CCl₄ | 936 | 600 | HFP[5] | 162 | 0.99 | 13.32 | 0.14 | 0.52 | 156-160 | 25 | 365 | 450 | 455 | 7.30 | 3.70 | | 76 | 72 |

[1] "Freon-113" diluent, 1,1,2-trichloro-1,2,2-trifluoroethane.
[2] Perfluorocyclopropane.
[3] "Freon-11" diluent; trichlorofluoromethane.
[4] TFE tetrafluoroethylene.
[5] HFP hexafluoropropylene.
[6] PFP perfluoropropane; inert tracer gas.

EXAMPLE VII

A mixture of 51 grams of trifluoroethylene and 750 ml. (1177 grams) of "Freon–113" diluent was heated to 110° C. in the autoclave (autogenous pressure=185 p.s.i.). Oxygen was added to maintain the total reaction pressure at 240–250 p.s.i. over a period of thirty minutes. The recovered product weighed 1200 grams. On distillation, 39 grams of a volatile product, boiling point range of −55° to +5° C., was isolated. Gas chromatographic analysis showed the presence of the 31 mole percent trifluoroethylene epoxide with the remainder as unreacted trifluoroethylene and other side products. The infrared spectrum of the epoxide showed major absorbence bands at 6.5, 7.6, 8.05, 8.5, 8.85, 9.5 and 11 microns.

EXAMPLE VIII

The autoclave was charged with 750 ml. (1175 grams) of "Freon–113" diluent and 81 grams of a mixture of chlorotrifluoroethylene (CTFE) and perfluoropropane (PFP) tracer (mole ratio CTFE/PFP=8.6). The mixture was heated to 75° C. (autogenous pressure=40 p.s.i.) with vigorous agitation. Oxygen was added continuously to keep the total reaction pressure at 90 to 100 p.s.i. The reaction was carried out for twenty minutes. Analysis of the product by gas chromatography and infrared spectroscopy indicated the following results: relative moles of CTFE, CTFE epoxide and 2-chloroperfluoroacetyl fluoride were 0.9, 5.6 and 1.5, respectively (yield of chlorotrifluoroethylene epoxide and conversion of chlorotrifluoroethylene to the epoxide equal to 73% and 90%, respectively). The infrared spectrum of the epoxide showed major absorbence bands at 6.5, 7.95, 8.6, 8.95, 10.95, 11.05, and 13.65 microns.

EXAMPLE IX

A mixture of 167 grams of perfluoroally chloride and 575 ml. (900 grams) of "Freon–113" diluent was heated to 160° C. (autogenous pressure=300 p.s.i.). Oxygen was continuously added to maintain the total reaction pressure at 355 to 365 p.s.i. The reaction time was twenty minutes. The recovered product weighed 1048 grams. Gas chromatographic analysis of this product indicated the presence of three major components in addition to the solvent; 28.4 mole percent 3 - chloroperfluoro - 1,2 - epoxypropane, 6.0% 2 - chloroperfluoroacetyl fluoride, and the remainder unreacted perfluoroalkyl chloride and other side products. The infrared spectrum of 3 - chloroperfluoro - 1,2 - epoxypropane showed major absorbence bands at 6.5, 7.9, 8.25, 8.5, 8.7, 8.9, 9.2, 9.4, 10.7, 10.9, and 12.2 microns.

EXAMPLE X

A mixture of 72 grams of perfluorobutadiene and 800 ml. (1250 grams) of "Freon–113" diluent was heated to 85° C. in the autoclave (autogenous pressure equal to ∼65 p.s.i.). Oxygen was added to maintain a reaction pressure of about 120 p.s.i. The reaction time was ten minutes and a total product of 1264 grams was recovered. The product was distilled and a fraction, B.P. 0° to +8° C., was obtained. Gas chromatographic analysis of this fraction showed the major components to be perfluoro-3,4-epoxybutyryl fluoride and unreacted perfluorobutadiene in an approximately 1 to 2 mole ratio. The infrared spectrum of perfluoro-3,4-epoxybutyryl fluoride showed major absorbence bands at 5.3, 6.65, 7.7, 7.9, 8.65, 9.0, and 9.8 microns.

EXAMPLES XI TO XIII

Hexafluoropropylene epoxide was produced by the following procedure.

Into a stainless steel tubular reactor, lined with polytetrafluoroethylene and having an internal diameter of 3/16 inch and a length of ten feet, submerged in an oil bath to maintain a temperature of approximately 200° C. and equipped with a back pressure regulator was charged with diluent and liquid haloolefin under the conditions set forth in Table B. The resulting product was analyzed and infrared scans showed a characteristic strong absorption band at 6.43 microns indicating the presence of hexafluoropropropylene epoxide. The flow rates of the diluent and oxygen were measured at atmospheric temperature and pressure.

TABLE B

| Example | Diluent | | Back pressure setting | HFP flow rate, ml./min. | Oxygen flow rate, cc./min. | Product HFPO/HFP |
|---|---|---|---|---|---|---|
| | Name | Flow rate, ml./min. | | | | |
| XI | $N_2$ | 850 | 1,200 | 0.89 | 65 | 17/83 |
| XII | He | 930 | 1,200 | 0.88 | 65 | 22/78 |
| XIII | $CO_2$ | 600 | 900 | 0.89 | 65 | 1.2/98 |

EXAMPLES XIV TO XXV

A 350 ml. stainless steel high pressure shaker tube was charged with 75 ml. of liquid phase inert diluent and 15 gm. hexafluoropropylene. The shaker tube was then pressured to 150 p.s.i. with oxygen and then heated to 130° C. for a period of about 15 minutes. The tube was then cooled to room temperature. The volatile fraction contained in the tube was analyzed by infrared spectroscopy and showed a distinctive band at 6.43 microns, characteristic of hexafluoropropylene epoxide. This experiment was carried out with the following inert diluents with the same results: 1,2-dibromohexafluoropropane, 1,2-dibromo - 1 - chloro-trifluoroethane, 1-chloro-3-hydro-hexafluoropropane, 1,1-dichloro-2,2,2 - trifluoroethane, 1,3 - dichlorotetrafluoroacetone, hepta-fluorobutyric anhydride, 2-(perfluoropropoxy)perfluoropropionyl fluoride, octafluorodithiane, 1,2 - dichlorohexafluorocyclopentene, perfluorocyclopentene, perfluoro-2-butyloxolane, and tris (perfluorobutyl)amine.

EXAMPLE XXVI

A supply vessel containing 15 weight percent hexafluoropropylene dissolved in octafluorocyclobutane was connected to the tubular reactor of Example XI. The flow rate of the liquid was 6.5 ml./min.

The reactor was pressured to 1200 p.s.i. The temperature of the reactor was raised above the critical temperature of the diluent so that the diluent passed into the gas phase. Into the reactor was passed 75 ml./min. of oxygen (room temperature and atmospheric pressure). Infrared analysis determined the principal reaction product to be hexafluoropropylene epoxide. The yield was 76.1% ±2.5% and the conversion was 15%. The ratio of hexafluoropropylene epoxide to hexafluoropropylene was found to be 16/113.5.

The foregoing examples illustrate an improved method for preparing halogenated epoxides. Various modifications within the spirit of this invention will occur to those skilled in the art and it is intended that all such are to be included within the scope of the following claims.

The haloolefin epoxides of the present invention are readily polymerized to useful substances using organic amines and bases. In addition, these compounds readily isomerize to the corresponding acid fluoride. Further disclosure of the usefulness of certain haloolefin epoxides is found in several foreign patents, viz., British 904,877, published Sept. 5, 1962 and French Pat. 1,262,507, issued Apr. 17, 1961, to Eleuterio and Meschke.

What is claimed is:

1. A process for the preparation of halogenated epoxides which comprises heating a haloolefin selected from the class consisting of $CF_2=CFX$ wherein X is F or $CF_3$ with oxygen, said haloolefin and said oxygen being present in a molar ratio of 1/1 to 30/1 at superatmospheric pressure in an inert fluid diluent selected from the class consisting of: nitrogen; carbon dioxide; noble gases; compounds containing only C—C, C—F, C—Br, C—Cl, C—O, C—S, C—N, and C—H single bonds and in which the C—H group is limited to one H per carbon atom and said carbon atom is in turn bonded only to fluorine, a combination of fluorine and carbon, a combination of chlorine and carbon, a combination of fluorine, oxygen and carbon or a combination of fluorine, oxygen and carbon or a combination of fluorine and chlorine; unsaturated compounds containing only carbon and fluorine or carbon, fluorine and chlorine and in which both carbon atoms of the double bond are in turn bonded to at least one carbon atom; compounds having the structure

or

wherein R and R' are monovalent radicals containing only C—C, C—F, C—Br, C—Cl, C—O, C—S, C—N, and C—H single bonds and in which the C—H group is limited to one H per carbon atom and said carbon atom is in turn bonded only to fluorine, a combination of chlorine and carbon, a combination of fluorine, oxygen and carbon or a combination of fluorine and chlorine; and mixtures thereof; the concentration of said haloolefin being from 1 to 50 weight percent at a temperature of from 50° to 250° C. and obtaining as a result thereof a halogenated epoxide having a formula selected from the class consisting of

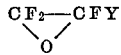

wherein Y is F or $CF_3$, respectively.

2. The process of claim 1 in which said haloolefin is tetrafluoroethylene and in which the haloolefin epoxide recovered is tetrafluoroethylene epoxide.

3. The process of claim 1 in which said haloolefin is hexafluoropropylene and in which the haloolefin epoxide recovered is hexafluoropropylene epoxide.

4. The process of claim 1 wherein the inert diluent is 1,1,2-trichloro-1,2,2-trifluoroethane.

5. The process of claim 1 wherein the inert diluent is trichlorofluoromethane.

6. The process of claim 1 wherein the inert diluent is perfluorodimethylcyclobutane.

7. The process of claim 1 wherein the inert diluent is carbon tetrachloride.

8. The process of claim 1 wherein the inert diluent is perfluoro-2-butyloxolane.

9. The process of claim 1 wherein the inert diluent is tris(perfluorobutyl)amine.

10. A process for the preparation of halogenated epoxides which comprises heating a haloolefin selected from the class consisting of $CF_2=CFX$ wherein X is F or $CF_3$ with oxygen, said haloolefin and said oxygen being present in a molar ratio of 1/1 to 30/1 at superatmospheric pressure in an inert fluid diluent, the concentration of said haloolefin being from 1 to 50 weight percent at a temperature of from 50 to 250° C., and obtaining as a result thereof a halogenated epoxide having a formula selected from the class consisting of

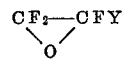

wherein Y is F or $CF_3$, respectively.

11. The process of claim 10 wherein the haloolefin is hexafluoropropylene, the inert fluid diluent is perfluorodimethylcyclobutane, fluorotrichloromethane, 1,1,2-trichloro-1,2,2-trifluoroethane, or carbon tetrachloride in the liquid phase, up to 20% by weight of said hexafluoropropylene is present in said diluent, and the oxygen partial pressure is up to 200 p.s.i.

12. A process for the preparation of tetrafluoroethylene epoxide, comprising heating tetrafluoroethylene at a temperature of 90 to 110° C. with oxygen in a molar ratio of at least greater than one in an inert solvent which is perfluorodimethyl-cyclobutane, fluorotrichloromethane, 1,1,2-trichloro-1,2,2-trifluoroethane, or carbon tetrachloride, under autogenous pressure plus the pressure provided by said oxygen, and obtaining as a result thereof tetrafluoroethylene epoxide.

13. A process for the preparation of hexafluoropropylene epoxide comprising heating a solution of 14.5 percent by weight hexafluoropropylene in 1,1,2-trichloro-1,2,2-trifluoroethane at a temperature of 149 to 150° C. and an initial pressure of 310 p.s.i. together with sufficient oxygen to increase this pressure to 380 p.s.i., and obtaining as a result thereof hexafluoropropylene epoxide.

References Cited

UNITED STATES PATENTS

| 3,213,134 | 10/1965 | Morin | 260—544 |
| 2,676,983 | 4/1954 | Hurka | 260—544 |
| 3,392,097 | 7/1968 | Gozzo et al. | 260—348.5 X |
| 2,549,892 | 4/1951 | Chaney. | |
| 2,622,088 | 12/1952 | Thomas. | |
| 2,829,147 | 4/1958 | Molotsky et al. | |
| 3,125,599 | 3/1964 | Warnell. | |
| 2,279,469 | 4/1942 | Law. | |

FOREIGN PATENTS

| 363,099 | 12/1931 | Great Britain. |
| 947,364 | 8/1956 | Germany. |
| 904,877 | 9/1962 | Great Britain. |

OTHER REFERENCES

Hazeldine et al., Jour. Chem. Soc. (London) 1959, pp. 1084–1090.

Ginsburg et al., Chemical Abstracts vol 59, p. 5008; Doklady Akad. Nauk. SSSR, vol. 149, pp. 97–9, March 1963.

Caglioti et al., Jour. Chem. Soc. (London), December 1964, pp. 5430–33.

Malinovskii, M.S., "Epoxides and Their Derivatives" (1965), p. 65.

NORMA S. MILESTONE, Primary Examiner

U.S. Cl. X.R.

260—544